Patented Aug. 30, 1932

1,874,310

UNITED STATES PATENT OFFICE

RICHARD L. KRAMER, OF WILMINGTON, DELAWARE, ASSIGNOR TO E. I. DU PONT DE NEMOURS & COMPANY, OF WILMINGTON, DELAWARE, A CORPORATION OF DELAWARE

CELLULOSE ACETATE COMPOSITION

No Drawing. Application filed February 27, 1928. Serial No. 257,547.

This invention relates to cellulose acetate compositions and more particularly those compositions containing a softener for the cellulose acetate.

Cellulose acetate compositions have been used for many purposes heretofore and these compositions sometimes contained a softener. However, the choice of softeners which might be used has been confined to a small number of available substances and all of these are not satisfactory having one or more undesirable characteristics such as being subject to oxidation, development of rancidity, cold cracking of films containing them, etc.

It is one of the objects of the present invention to provide cellulose acetate compositions which can be used for many purposes such as lacquers, enamels, plastics, photographic films, coating woven fabrics to produce artificial leather or fabrikoid, and the like. It is a further object to provide cellulose acetate compositions for producing films having great durability and pliability and not being liable to various faults such as rancidity development, cold cracking, and so on, as found in prior art films. A still further object is to provide an artificial leather having the desirable characteristics mentioned. It is a still further object to improve generally upon cellulose acetate compositions, coatings and artificial leathers. Other objects will be apparent from the specification.

These objects are accomplished by using as softeners for cellulose acetate, the aryloxy-ethanol esters of carboxylic acids. These esters have excellent softening properties, are non-exuding and impart to the cellulose acetate films containing them, proper pliability and wearing qualities. Of the various esters which may be used, particular mention is made of phenoxy-ethyl phthalate, methyl-phenoxy-ethyl phthalate, methyl-phenoxy-ethyl laurate.

As a specific example illustrating the present invention, but without restricting the same thereto, the following composition is given:—

| | Per cent |
|---|---|
| Cellulose acetate | 10 |
| Phenoxy-ethyl phthalate | 1 |
| Composite solvent | 61 |
| Diluent | 28 |

This composition may be used for any suitable coating purpose and any suitable pigments may be added if desired. The proportions of the various ingredients may vary over wide limits, depending almost altogether upon the properties desired in the finished composition and the use to which the composition is to be put. Any suitable solvents may be used as is well known in the art, either singly or in admixture. Some of the more common solvents for cellulose acetate are acetone, diacetone alcohol and ethyl acetate. When it is desired to prepare lacquers, enamels or other coating compositions, there may be added one or more of the various resins commonly used in the coating art. Cellulose acetate plastic compositions may be prepared with suitable plasticizers, fillers, latent solvents, et cetera. When the compositions are to be applied as coatings on woven fabrics to produce artificial leather or fabrikoid, the application of the cellulose acetate composition is carried out in accordance with the general practices of the art, the present softeners introducing no complications into coating practices. The artificial leathers produced by the use of these compositions have great durability and pliability and the softener does not exude from the film during the embossing and other operations carried out for finishing the coated fabric.

The softeners specifically mentioned above may be prepared as follows, although other methods of preparation may be used:—

*Beta-phenoxy-ethyl phthalate.*—Heat together in a flask 100 grams of beta-phenoxy ethanol (Bentley, Haworth and Perkin, J.

Chem. Soc., 69, (1896) 164) and 54 grams of phthalic anhydride, on a steam bath for 4 hours. Pass HCl gas through for 15 minutes. Again heat on steam bath for 2 hours; pass HCl gas through for 15 minutes; transfer flask to oil bath and heat at 115°–120° C. for 4 hours. Transfer flask to steam bath and heat continuously for 2 days to drive off the last traces of hydrogen chloride. Wash product with water and then with sodium carbonate solution until neutralized. Again wash twice with water, and separate. The compound is a solid substance at 20° C.

*Beta-methyl-phenoxy-ethyl phthalate.*—Heat together in a flask 100 grams of beta-methyl-phenoxy ethanol (Boyd and Marle, J. Chem. Soc., 105, (1914) 2133), ortho or meta being satisfactory, or a mixture of para with the others, the solid para being soluble in the others, and 49 grams of phthalic anhydride for 4 hours on a steam bath. Pass HCl gas through for 15 minutes. Again heat on steam bath for 2 hours; pass HCl gas through for 15 minutess; transfer flask to oil bath and heat at 115°–120° C. for 4 hours. Transfer to steam bath and heat continuously for 2 days to drive off last traces of hydrogen chloride. Wash product with water and then with sodium carbonate solution until neutralized. Again wash twice with water, and separate. The compound is a viscous liquid at 20° C. with a slight but pleasant odor.

*Beta-methyl-phenoxy-ethyl laurate.*—Heat together in a flask 20 grams of beta-methyl-phenoxy ethanol and 27 grams cocoanut oil acids by oil bath. When temperature of bath reaches 127° C. start a stream of nitrogen bubbling through the mixture to sweep out water of esterification and continue the heating under these conditions until the product is almost neutral, wash with salt water, filter, and, if desired, decolorize with any suitable agent such as decolorizing charcoal. The compound is a liquid which begins to freeze at about $-1°$ C. and has a viscosity about equivalent to that of liquid cocoanut oil.

It will be understood that other aryloxy-ethanol esters of carboxylic acids may be used in place of those esters previously mentioned. Compounds having an aryl nucleus with a hydroxyl group united directly with a carbon of the nucleus are, in general, suitable for use in preparing the desired esters. Naphthol $C_{10}H_7OH$ and its derivatives, or xylenol and its derivatives, as well as the various phenoxy derivatives in which a hydrogen of the aryl ring has been replaced by a substituent atom or radical, are suitable. As a specific example, beta methyl naphthoxy ethanol, $CH_3C_{10}H_6O-CH_2-CH_2-OH$ may be used in place of the other softeners. In those cases where there is danger of the selected softener acting as a precipitant, it may be mixed with a suitable solvent softener.

In referring to phthalates herewith, it will be understood that reference is made to the di- or neutral phthalate.

By the term "softener", I, of course, mean a material imparting flexibility to the cellulose acetate films, and of such low volatility that said material will remain for a long period of time as a constituent of the cellulose acetate coating or film of which it originally forms a part.

Any suitable variations may be made in the details of the invention without departing from the spirit thereof.

I claim:

1. A product comprising cellulose acetate and as a softener therefor a phthalic acid ester of an aryloxy ethanol in which the oxygen atom joining the aryl radical with the ethanol group is directly connected to a benzene ring carbon atom of the aryl radical.

2. A product comprising cellulose acetate and as a softener therefor phenoxy-ethyl phthalate.

3. A product comprising cellulose acetate and as a softener therefor methyl-phenoxy-ethyl phthalate.

4. A liquid coating composition comprising cellulose acetate, volatile solvent therefor and phenoxy-ethyl phthalate.

5. A liquid coating composition comprising cellulose acetate, volatile solvent therefor and methyl-phenoxy-ethyl phthalate.

6. A product comprising cellulose acetate and as a softener therefor a compound from the group consisting of phenoxy-ethyl phthalate, methyl-phenoxy-ethyl phthalate, and methyl-phenoxy-ethyl laurate.

7. A liquid coating composition comprising cellulose acetate, a volatile solvent therefor, and a compound from the group consisting of phenoxy-ethyl phthalate, methyl-phenoxy-ethyl phthalate, and methyl-phenoxy-ethyl laurate.

8. A product comprising cellulose acetate and, as a softener therefor, a compound from the group consisting of the phthalic and lauric acid esters of an aryloxy ethanol in which the oxygen atom joining the aryl radical with the ethanol group is directly connected to a benzene ring carbon atom of the aryl radical.

9. A product comprising cellulose acetate and, as a softener therefor, a lauric acid ester of an aryloxy ethanol in which the oxygen atom joining the aryl radical with the ethanol group is directly connected to a benzene ring carbon atom of the aryl radical.

10. A product comprising cellulose acetate and, as a softener therefor, methyl-phenoxy-ethyl laurate.

In testimony whereof, I affix my signature.

RICHARD L. KRAMER.